March 5, 1968  J. A. SCHOLL  3,371,559
MEANS FOR AUTOMATIC TOOL FEED AND RETRACTION
CONTROL OF BORING AND FACING HEADS
Filed July 15, 1966  5 Sheets-Sheet 1
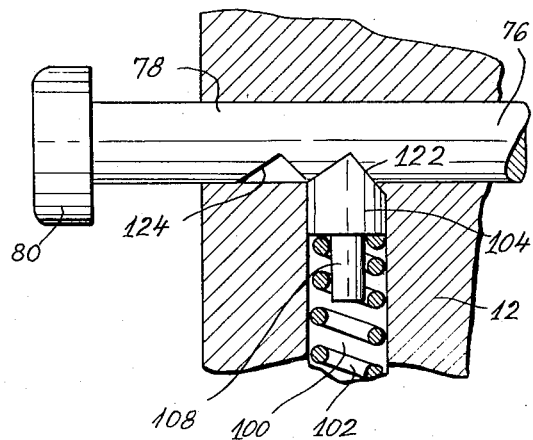
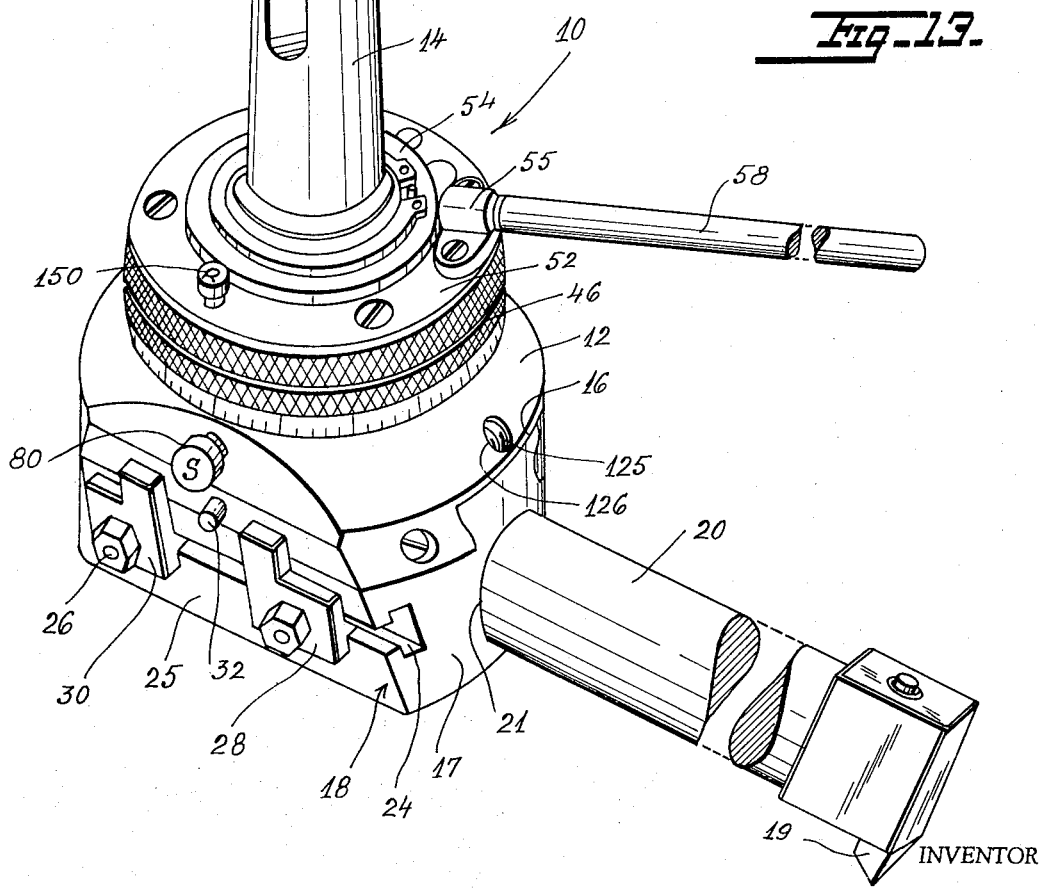
INVENTOR
Jule A. Scholl
BY Polachek & Saulsbury
ATTORNEYS

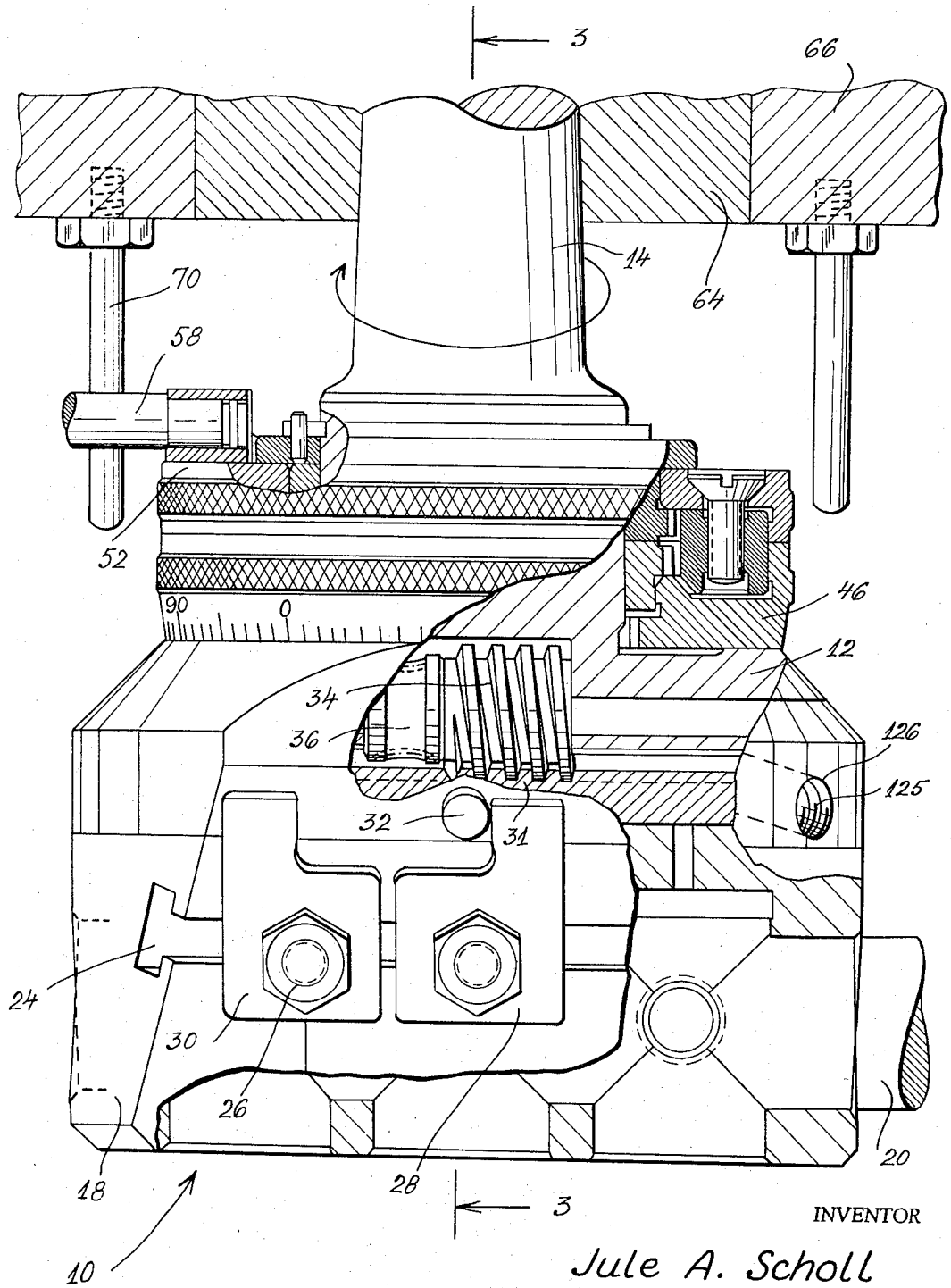
Fig_2_

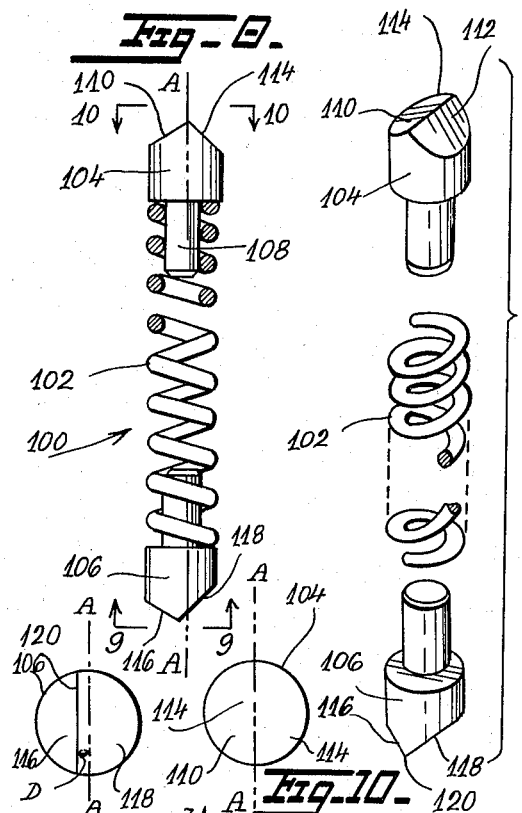
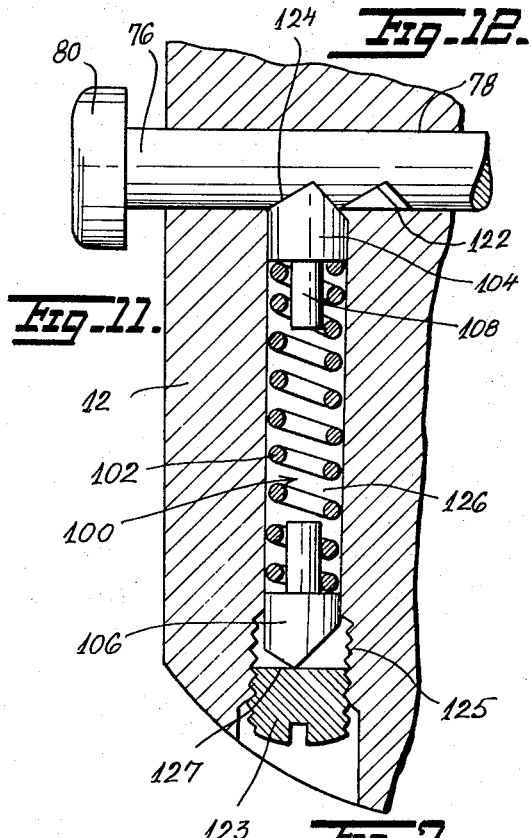
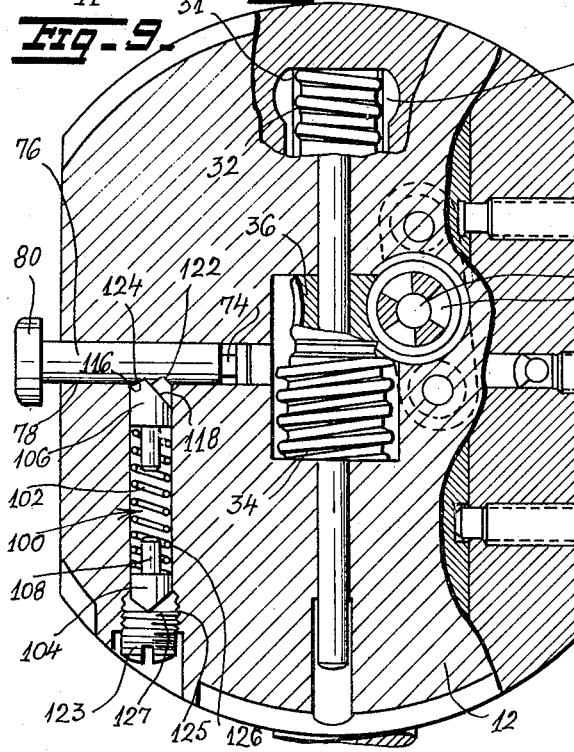
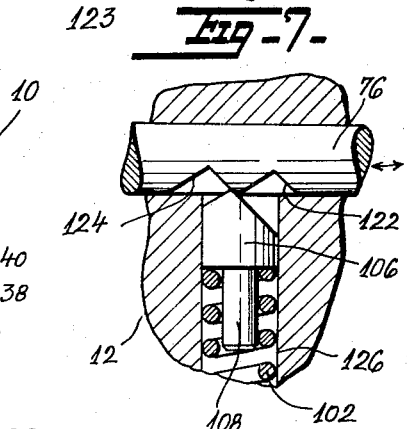

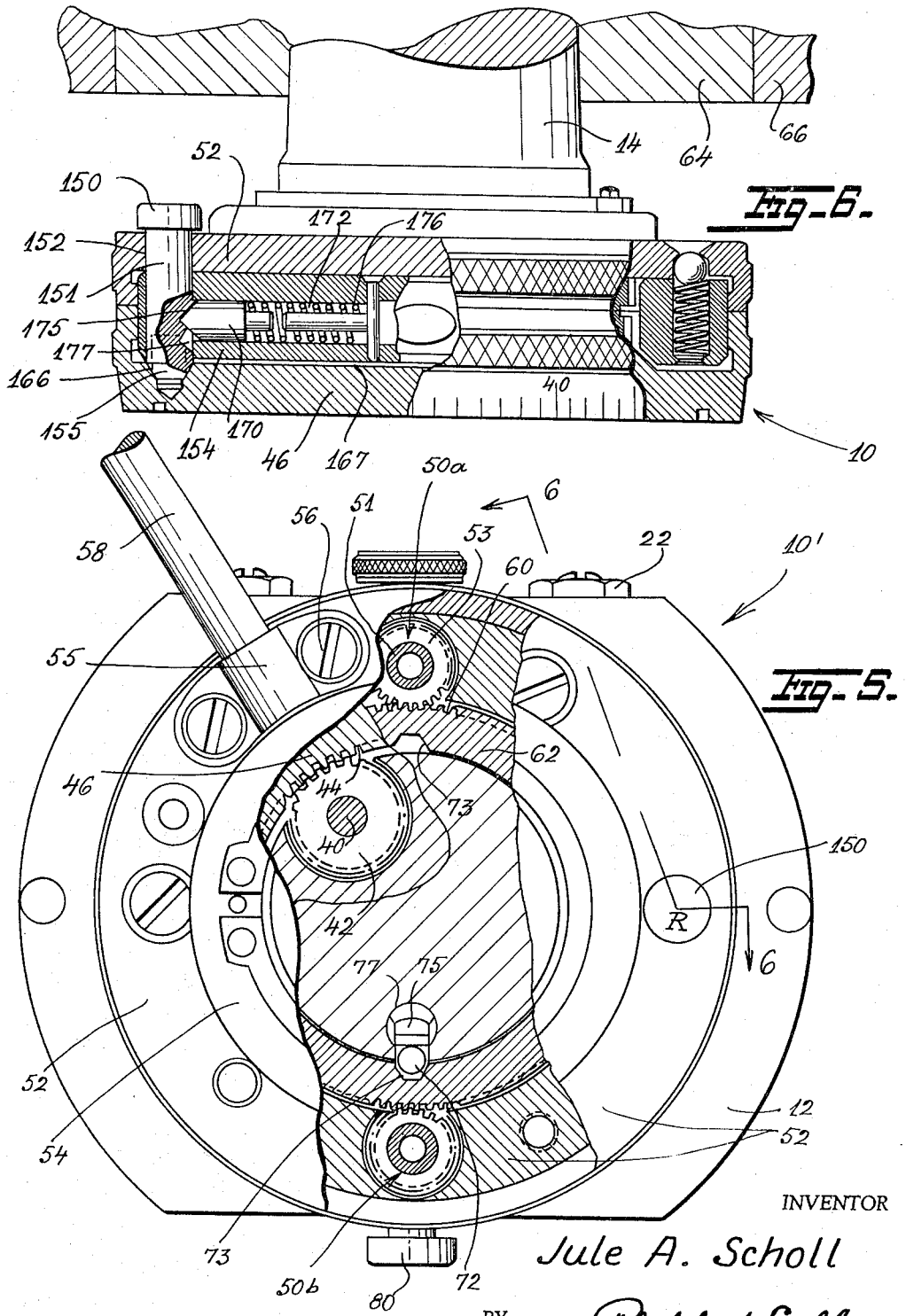

United States Patent Office 3,371,559
Patented Mar. 5, 1968

3,371,559
MEANS FOR AUTOMATIC TOOL FEED AND
RETRACTION CONTROL OF BORING AND
FACING HEADS
Jule A. Scholl, 41—31 51st St.,
Woodside, N.Y., 11377
Filed July 15, 1966, Ser. No. 565,422
9 Claims. (Cl. 77—58)

This invention relates to improvements in universal boring and facing heads, and more particularly concerns means for rendering automatic advance and retraction of a tool holder or carriage in such a head. The invention is especially applicable to universal boring and facing heads of the type manufactured by Emil Wohlhaupter & Co. of Frickenhausen, Germany, particularly models currently designated UPA 1, UPA 2 and UPA 3.

The particular boring and facing heads mentioned have heretofore been provided with a manually operable start button which initiates advance of a tool holding carriage in a rotating head when the button is pressed. After the carriage has advanced a predetermined distance radially of the axis of the head, the carriage encounters a stop member and moves no further radially of the head, due to the release of a clutch mechanism provided in the head. To effect retraction of the carriage radially of the head to a starting position, a manually operable reverse control button must be pressed. Then the carriage retracts at a higher rate of speed than its advance speed. The carriage retracts until it encounters another stop member. Thereupon, the carriage is held against further radial retraction, while the head continues to rotate. It will be understood that manual operation of the start and reverse buttons is essential for control of the carriage drive.

It has been found that when a boring and facing head of the type described is employed in computer controlled automated machines responsive to data tape, data cards or other types of data input, manual operation of the boring and facing heads is not practical nor desirable. Considerable safety hazards are involved when an operator is required to insert his hand into an automated machine setup for starting and stopping tool carriage movements. Constant personal attention of an operator is required, which is objectionable in an automated installation. The present invention therefore has as a principal object to provide means for rendering automatically the starting of feed and the starting of retraction of the tool carriage in a boring and facing head.

Another object of the invention is to provide a clutch control device which accomplishes the first mentioned object without requiring any fundamental change in the structure of the boring and facing head itself.

Still another object is to provide a clutch control plunger arranged so that merely by reversing its position in a boring and facing head, start of carriage feed and start of carriage retraction can be rendered selectively automatic or subject to manual control.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a boring and facing head of the type to which the invention is applicable.

FIG. 2 is a front elevational view of the head of FIG. 1 on an enlarged scale, parts being broken away.

FIG. 4 is a transverse sectional view taken on the broken line 4—4 of FIG. 3.

FIG. 5 is a transverse sectional view taken on line 5—5 of FIG. 3.

FIG. 6 is a fragmentary sectional view taken on broken line 6—6 of FIG. 5.

FIG. 7 is an enlarged fragmentary sectional view similar to a part of FIG. 4, showing the mode of operation of the clutch control mechanism according to the invention.

FIG. 8 is an enlarged side elevational view of a clutch control device according to the invention.

Figure 3:
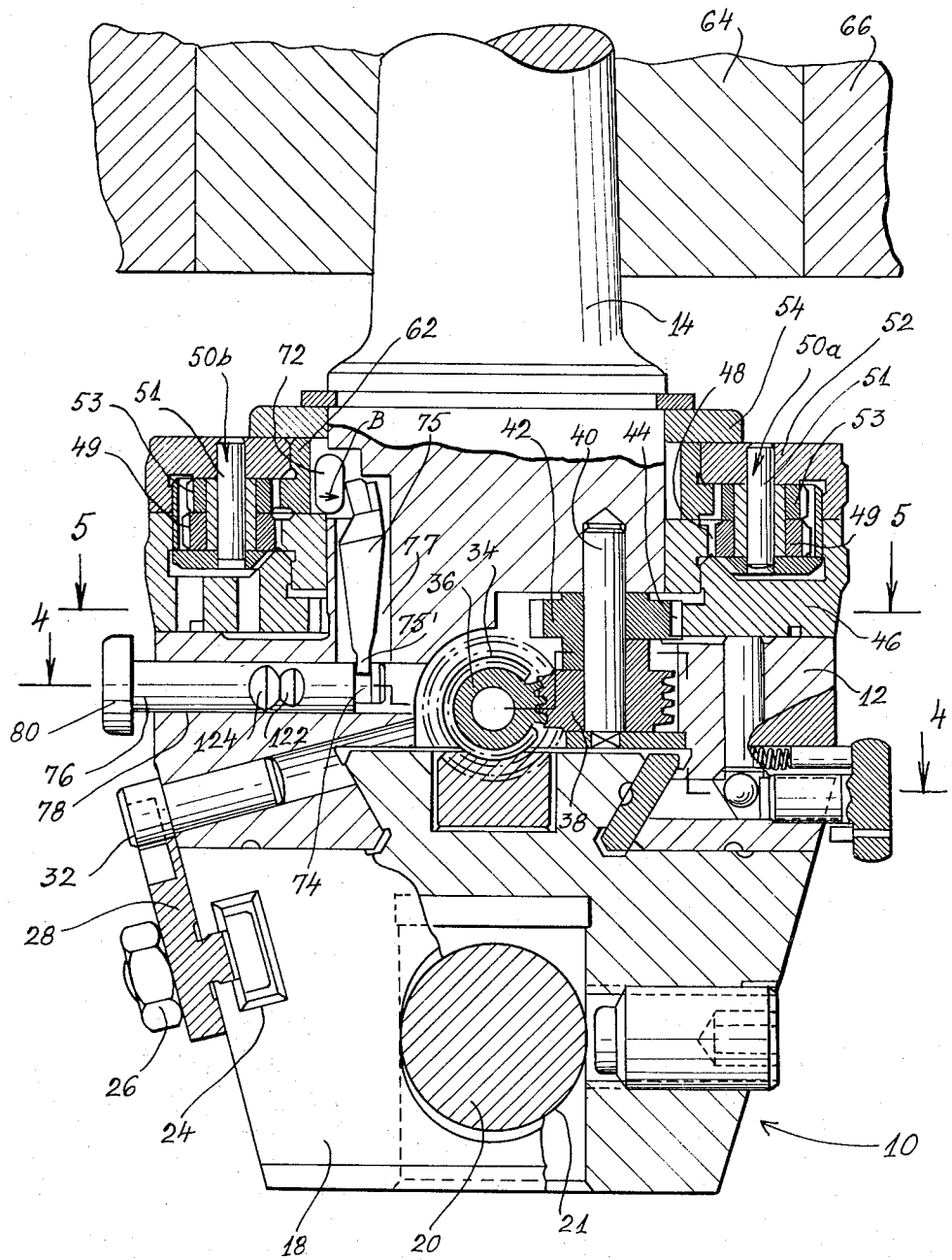
FIG. 3 is a transverse sectional view on a reduced scale on line 3—3 of FIG. 2, certain parts being broken away and other parts omitted to show the invention more clearly.

FIGS. 9 and 10 are end views taken on lines 9—9 and 10—10 respectively of FIG. 8.

FIG. 11 is an exploded perspective view of the parts of the device of FIG. 8.

FIG. 12 is an enlarged fragmentary sectional view similar to a part of FIG. 4, showing the clutch control device reversed in the head from its position in FIG. 4, and holding the start button depressed.

FIG. 13 is a sectional view similar to a part of FIG. 12, showing the reversed clutch control device holding the start button extended.

Referring first to FIGS. 1–6, there is shown a boring and facing head 10. This head has a generally cylindrical body 12 which is integral with a shaft 14 shown axially vertical and axially aligned with body 12. The body 12 has a transverse dovetailed slot or keyway 16 at its bottom or outer end. Slidably engaged in this slot is a block 17 which serves as a carriage 18 for a tool arm 20 supporting cutting tool 19. The tool arm is removably inserted in a transverse bore 21 in the carriage and is locked there by a suitable bolt 22 shown in FIG. 4.

A dovetailed slot 24 is formed in the front face 25 of the carriage 18. In this slot can be engaged by means of bolts 26 a pair of adjustable stop plates 28, 30. The stop plates are spaced apart on opposite sides of a stud 32 which extends outwardly of body 12 and serves as a stop member when abutted by either of plates 28, 30 to stop transverse travel of the carriage 18 with respect to body 12 at the end of the head. At the upper or inner end of the carriage is a rack gear 31 defined by milled teeth 32. These teeth are engaged by a worm 34 integrally formed with a worm gear 36 axially aligned with the worm; see FIGS. 2, 3 and 4.

The worm gear 36 is driven by a helical gear 38 secured on a shaft 40, which shaft is rotatably journaled in body 12. The shaft 40 carries another gear 42 which engages teeth of an internal gear 44 formed inside of a collar 46. This collar is rotatably mounted with respect to body 12 for driving gear 42 which in turn drives gear 38 and through the gear train 36, 34 and 31 in turn, drives the carriage 18.

Collar 46 is formed with external upper circumferentially extending gear teeth 48 which are engaged at opposite sides of the collar by lower gears 49 of two gear assemblies 50a and 50b. The gear assemblies each have a shaft 51 rotatably journaled in a retaining ring 52 and each carrying a gear 49 and a gear 53. The ring 52 is rotatably disposed between a holding ring 54 and collar 46. Ring 52 is provided with bracket 55 held by screws 56 on the exposed end of the collar. This bracket holds a torque rod 58 which extends radially out of the head 10. Gears 53 are engaged with external circumferential teeth 60 of an internal coupling ring 62 which can rotate inside of ring 52. Shaft 14 is rotatably supported by a drive shaft 64 journaled in wall 66 of a variable speed drive assembly (not shown). Rod 58 contacts any one of a number of studs 70 extending outwardly of stationary wall 66 shown in FIG. 2 to keep ring 52 from rotating when the body 12 and shaft 14 rotate.

Coupling ring 62 forms part of a clutch mechanism including a short cylindrical pin 72 shown in FIGS. 3 and 5. This pin can be forced radially outward to engage in any one of a plurality of spaced axially extending grooves 73 formed inside of ring 62; see FIG. 5. The pin is located near the upper end of a lever 75 located radially inward of pin 72 and loosely fitted in bore 77 in body 12; see FIG. 3. The lower end 75' of the lever engages in a slot 74 formed near the inner end of shaft 76. Shaft 76 extends radially outward of the body 12 through a bore 78 in which the shaft is slidably disposed. The shaft terminates in START button 80 outside the body 12. When the start button is pushed radially inwardly of body 12, lever 75 will tilt counterclockwise as viewed in FIG. 3. This will push pin 72 radially outwardly to lock in one of grooves 73 so that ring 62 locks with body 12.

The clutch mechanism further includes a clutch control device 100 best shown in FIGS. 4, 7–10. The device 100 comprises a helical coil spring 102 at opposite ends of which are angle pins 104 and 106. The pins have stub shafts 108 engaging the pins axially at opposite ends of the spring 102. Pin 104 has two angularly disposed end faces 110 and 112. The faces meet at the apical edge 114 of the pin which lies in the central axial plane A—A of the device 100 including the spring and both pins. Face 110 is disposed 45° to plane A—A and face 112 is disposed 30° to central plane A—A; see FIG. 10. Pin 106 has two end faces 116 and 118 meeting at apical edge 120 of the pin. Edge 120 is offset laterally a short distance D from and parallel to plane A—A; see FIG. 9.

Shaft 76 has two adjacent lateral notches 122, 124. In the outer notch 124 engages the angled faces 116, 118 of pin 106; see FIGS. 4 and 7. A cap screw 123 is screwed into the outer threaded end 125 of a smooth bore 126 in which device 100 is axially disposed; see FIG. 4. The cap screw has a flat end 127 which contacts the angled end of pin 104 while the angled end of pin 106 is engaged in notch 124 under bias of spring 102.

In the position of the parts shown in FIGS. 3, 4 and 5, during advance of carriage 18 to feed tool 19 the work (not shown), the shaft 14 and body 12 will rotate in one direction rotated by shaft 64. Ring 52 is held stationary by one of studs 70 via rod 58. Ring 62 is locked to body 12 by pin 72 and rotates with the body. Ring 62 rotates gears 53. Gears 49 rotate with gears 53 causing collar 46 to rotate. Collar 46 rotates gear 42. Gear 38 rotates with gear 42. Gear 38 rotates gear 36 so that worm 34 rotates and carriage 18 is advanced via rack gear 31. Suppose now that the stop plate 28 encounters the stop stud 32, further transverse movement of the carriage 18 will be prevented. This will cause a stopping of rotation of the gear train back through the worm 34, worm gear 36, gear teeth 44, and gear assemblies 50a, 50b.

When the gear assemblies 50a, 50b are thus locked and stop rotating, ring 62 which previously rotated these gear assemblies is now locked to gears 53 and slips inside ring 52. The clutch mechanism is now disengaged. Pin 72 is forced radially inward of the head out of the groove 73 in which it is engaged, and is carried around the inside of ring 62 while body 12 rotates. When the pin 72 is forced inwardly in the direction of arrow B in FIG. 3, it tilts lever 75 which is loosely fitted in bore 77, in a clockwise direction. The lower end of the lever then tends to move radially outwardly and shaft 76 tends to move axially outwardly. The end 120 of angled tip 106 slides along the angled faces of notch 124 but does not lose engagement with this notch as shown in FIG. 7. Shaft 76 reciprocates slightly as pin encounters successive grooves 73 and then is forced out of them. As a result, shaft 14 and body 12 continue to rotate while the carriage 18 is held stationary with respect to the body 12. Now the direction of rotation of shaft 64 can be reversed automatically by its computer control (not shown). When shaft 64 reverses ring 52 will turn with body 12 only part of one turn until rod 58 encounters the next stop stud 70. Then the same driving action takes place as previously described but in reverse direction so that the carriage 18 moves transversely of body 12 until plate 30 encounters stop stud 32. This completes the desired automatic retraction of the carriage.

Now the clutching mechanism works in the same manner as described before. While the shaft 14 and body 12 keep rotating, shaft 76 of the tool feed control keeps reciprocating, moving slightly outwardly each time pin 72 is forced out of a groove 73 of ring 62 and moving slightly inwardly each time pin 70 engages momentarily in a groove 73. To start the carriage moving in the tool advance direction it is only necessary to reverse the drive of shaft 64 again and the feeding of the tool via the carriage movement will take place again as above described. It will be noted that it is not necessary for any operator to manipulate or control the start of carriage drive and the start of carriage reversal. All this takes place automatically under automated control of drive shaft 64.

Suppose now, that the head 10 is to be converted to manual control of both start of carriage drive and start of carriage retraction. Then the control device 100 will be reversed in position in bore 126 as shown in FIGS. 12 and 13. To start driving the carriage, the start button will be pushed in and the angled tip 104 of the device 100 will engage in notch 124. The carriage will be moved along in the same manner as described previously and will be stopped when plate 28 encounters stop stud 32. This time however, when pin 72 is forced out of groove 73 in ring 62, the lever 75 pushes the shaft 76 axially outward until pin 104 engages in notch 122 as shown in FIG. 13. Now further rotation of the shaft 14 and body 12 in the same direction or in opposite direction will make no difference. The carriage will not retract. This results because ring 62 is unlocked from body 12 and remains frictionally engaged by stationary ring 52. The cap screw 123 is adjustably positioned in bore 126 so that it can be turned to adjust axial tension in spring 102, to barely overcome the rate of cut, type of material, and surface fee per minute.

To effect retraction of the carriage 18 under manual control, there is provided a REVERSE button 150 on top of stationary plate 52. This button as shown in FIG. 6 has a shaft 151 which extends downwardly through a bore 152 in ring 154 integrally joined to ring 52. The shaft 151 has pointed end 155 which engages in a tapered, countersunk recess 166 formed on annular surface 167 inside of collar 46, when the button 150 is depressed. An angled pin 170 slidably engaged in a bore 172 in ring 154 engages in upper notch 175 of shaft 151 and is held by a coil spring 176 in bore 172. Thus the ring 52 and collar 46 are coupled together. This engagement effects a by-pass of the gear assemblies 50a, 50b which are locked to the collar. The stationary collar 46 now causes gears 42 and 38 to turn since the shaft 40 carrying gears 38, 42 is being revolved by the rotating shaft 14 and body 12. As a result, even though the shaft 14 and body 12 continue to rotate in the same direction as previously, the gears 38, 42 rotate in the opposite direction from their previous rotation. Thus, the worm gear 36 and worm 34 turn oppositely from their previous direction and the carriage is driven in the opposite or retraction direction.

Retraction continues until stop plate 30 encounters stop stud 32 when no further transverse movement of the carriage 18 is possible. The gear train 31, 34, 36, 38, 42, 44 locks, and through back pressure, the pointed end of shaft 151 is forced out of tapered recess 166. Angles pin 170 engages in lower notch 177 of shaft 151 and holds this shaft elevated. The collar 46 is unlocked from ring 52. The shaft 14 and body 12 can continue to turn since without further transverse movement of the carriage 18. This will continue until the operator manually presses start button again to engage angled pin 104 in outer notch 124 of shaft 76. The ratios of the gears are such that retraction of the carriage takes place at a much higher speed than carriage drive for advancing the tool arm 20 and tool 19 radially outward of the head.

If automatic control of start of carriage advance and carriage retraction is desired, it is only necessary to reverse device 100 axially in bore 126. This will deactivate the manual retraction control of button 150 as well as the manual start control of button 80. Automatic operation then takes place as above described.

It will be understood that no essential changes are required in any parts of head 10 to effect automatic operation other than provision of an angled tip 106 with its knife edge 120 displaced from the central plane A—A of the tip, an insertion of tip 106 into notch 124 of shaft 76. Mere reversal of device 100 to engage tip 104 in notch 124 effects manual control of carriage drive for tool feed. The deactivated manual reverse control button 150 stays deactivated until device 100 is reversed to engage tip 104 in at shaft 76.

The invention fulfills a long felt need by unexpectedly effecting economics in labor and machine working time, improvements in machining and work efficiency, prevention of accidents by eliminating manual control operations and increased versatility of the boring and facing heads.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A clutch control device for a clutch mechanism in a boring and facing head having a body rotatable on an axis, a tool supporting carriage mounted on said body and movable thereon in a straight path transversely of said axis, a stationary member slidingly engaged with said body while the body rotates, and a gear train operatively interconnecting said stationary member and carriage to drive the same transversely of said body, said clutch mechanism being interposed between said gear train and stationary member; said device comprising clutch means yieldably holding said gear train in operative engagement with stationary member so that the clutch means yields when said carriage encounters an obstruction to lateral movement on said body while the body continues to rotate in one direction, and so that the clutch means automatically operatively reengages said gear train and stationary member when the body is rotated in an opposite direction while the carriage moves away from said obstruction.

2. A clutch control device as recited in claim 1 for automatically effecting drive of said tool carrying carriage in either of two directions in said path transverse to said axis, wherein said clutch mechanism includes a ring slidably disposed inside said stationary member, external teeth on said ring forming part of said gear train, internal grooves formed in said ring, a pivotable lever in said body, a pin engaged with one end of said lever and laterally into each of said grooves, a control button carried by said body, said body having a shaft with a pair of adjacent radial notches and with a groove near one end, said body having a bore to receive the clutch device; said clutch means further comprising a cylindrical element having two faces at one end disposed at an acute angle to each other and terminating in an apical edge offset laterally from and parallel to a central axial plane of said element and spring means engaging the other end of said element for urging said element inwardly of said body in said bore to engage in one of said notches and to remain engaged in said one notch while the shaft reciprocates axially when said carriage encounters said obstruction.

3. A clutch control device as recited in claim 2, further comprising another cylindrical element having two faces at one end disposed at an acute angle to each other and terminating in an apical edge lying in the central axial plans of said other element, said spring means engaging the other end of said other element, whereby the two elements can be reversed in position in said body to engage the apical end of the other element in said one notch, whereby said shaft will move axially outwardly to engage the end faces of the other element in the other notch when said carriage encounters said obstruction, and so that manual movement of said shaft inwardly of said body will be required to displace said shaft from enagement with said other element.

4. A clutch control device as recited in claim 2, further comprising a cap engageable in said bore to hold the clutch device in said bore, said cap being threaded for adjusting tension of said spring in said bore.

5. A clutch control device as recited in claim 3, further comprising a cap engageable in said bore to hold the clutch device in said bore, said cap being threaded for adjusting tension of said spring in said bore.

6. A clutch control device as recited in claim 2, wherein said spring is a helical coil spring, and wherein said element has a cylindrical shank at its other end engaged in one end of the spring.

7. A clutch control device as recited in claim 3, wherein said spring is a helical coil spring, and wherein each of said elements has a cylindrical shank at its other end engaged in opposite ends of the coil spring.

8. A clutch control device as recited in claim 6, further comprising a cap engageable in said bore to hold the clutch device in said bore, said cap being threaded for adjusting tension of said spring in said bore.

9. A clutch control device as recited in claim 5, wherein said spring is a helical coil spring, and wherein each of said elements has a cylindrical shank at its other end engaged in opposite ends of the coil spring.

References Cited

FOREIGN PATENTS 845,737  8/1952  Germany.

CARLTON R. CROYLE, *Primary Examiner.*

C. M. LEEDOM, *Assistant Examiner.*